Patented Oct. 28, 1947

2,429,758

UNITED STATES PATENT OFFICE 2,429,758

MANUFACTURE OF ISOPROPYL CHLORIDE

Frank C. Holmes, Baton Rouge, La., assignor to Ethyl Corporation, New York, N. Y., a corporation of Delaware No Drawing. Application October 22, 1945, Serial No. 623,857

2 Claims. (Cl. 260—663)

This invention relates to a catalysed hydrochlorination of propylene. Many hydrochlorination catalysts are known but they are not sufficiently selective in their action so as to avoid the hydrochlorination of ethylene along with the desired hydrochlorination of propylene.

One practical problem is the purifying of gaseous feed streams containing both ethylene and propylene. Such streams are obtainable from cracking furnaces or as by-products in dehydrogenation processes. The propylene is a disadvantageous, reactive impurity when such gases are processed to make derivatives of ethylene. I have discovered that granular anhydrous calcium sulfate is a selective catalyst for producing a reaction between hydrogen chloride and propylene to form isopropyl chloride, without catalyzing the hydrochlorination of co-present ethylene. The isopropyl chloride so formed may be easily removed by cooling the gas and condensing the isopropyl chloride. The isopropyl chloride may also be left in the gas, as it does not exhibit the disadvantages found when free propylene is present.

A granular anhydrous calcium sulfate is on the market under the trade name "Drierite" and it is made by the process described in U. S. Patent No. 1,887,349 to William A. Hammond. However, I find that this patent names maximum temperatures of about 300° C. Drierite, which has been heated to 400° C. for three hours, has just as good catalytic properties in my process as Drierite which has been heated to the lower temperatures named in the patent.

As is usual in gas phase catalysis, the lump size of the catalyst will be selected to provide adequate contact of the reacting gases, without being so fine as to require high pressures to force the gases through the catalyst bed.

In one method of carrying out my invention with an ethylene stream containing by volume 3% propylene, I add sufficient hydrogen chloride gas to react with all the ethylene and propylene. The gas stream then contains about 50 volume % hydrogen chloride, and is passed through anhydrous calcium sulfate catalyst. The catalyst is in the form of granules passing through a 4 mesh screen and retained on an 8 mesh screen. The reactor is maintained at a temperature of 35° C. and is operated at a pressure of 100 pounds. The exit gases contain less than 0.1 volume % free propylene. No detectable ethyl chloride is formed, despite the presence of sufficient hydrogen chloride to react with all the ethylene. The excess of hydrogen chloride is used to have it in the feed stream for further hydrochlorination following the hydrochlorination of propylene.

In another method of carrying out the invention, hydrogen chloride is mixed with pure propylene, the hydrogen chloride/propylene mole ratio being 1.05:1. The mixed gases are passed into a reactor maintained at 200° C. and operating at substantially atmospheric pressure. Approximately 90% of the propylene reacts to produce isopropyl chloride. Such a process has been continuously operated for over 100 hr. without any measureable decrease in yield, or cracking or polymerization of the hydrocarbon. A greater excess of hydrogen chloride is accompanied by a greater degree of propylene conversion. Substantially the same results were obtained at room temperature and 100 pounds pressure.

There is nothing critical in the reaction in temperature, pressure or mole ratio. No advantage has been found in using reaction temperatures substantially above 200° C. The reaction has been obtained at room temperature and without elevating the pressure. At reaction temperatures substantially below 200° C. I prefer to increase the pressure and have obtained good reactions at 35° C. and 150° C. at 100 pounds pressure. This pressure is not critical and lower pressures give good reactions. Where it is desired to produce isopropyl chloride as economically as possible I have found that the above mole ratio may be varied from as low as 0.7 to as high as 1.3.

The catalyst may become deactivated. The cause of deactivation is not understood, but it is believed that small amounts of adsorbed impurities on the surface of the calcium sulfate prevent the catalysis in this reaction. The catalyst is reactivated by heating it to above 100° C. and preferably to about 200° C.

I claim:

1. The process of making isopropyl chloride which comprises bringing gaseous hydrogen chloride and propylene into contact with granular anhydrous calcium sulfate.

2. The process of selectively chlorinating propylene in a propylene-ethylene mixture which comprises bringing the mixture and hydrogen chloride into contact with granular anhydrous calcium sulphate.

FRANK C. HOLMES.

REFERENCES CITED

The following references are of record in the file of this patent:

UNITED STATES PATENTS

| Number | Name | Date |
|--------|------|------|
| 1,591,151 | Wibaut | July 6, 1926 |
| 1,637,972 | Suida | Aug. 2, 1927 |
| 2,031,228 | Reilly | Feb. 18, 1936 |
| 2,328,275 | Heard | Aug. 31, 1943 |